(12) United States Patent  
Kim

(10) Patent No.: US 10,200,210 B2
(45) Date of Patent: Feb. 5, 2019

(54) ELECTRONIC DEVICE AND COMMUNICATIONS METHOD THEREOF

(71) Applicant: LG ELECTRONICS INC., Seoul (KR)

(72) Inventor: Min Ki Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/649,305

(22) Filed: Jul. 13, 2017

(65) Prior Publication Data

US 2018/0054323 A1    Feb. 22, 2018

(30) Foreign Application Priority Data

Aug. 17, 2016  (KR) .................. 10-2016-0104042

(51) Int. Cl.
| | |
|---|---|
| *H04L 12/403* | (2006.01) |
| *H04B 3/54* | (2006.01) |
| *H04L 5/14* | (2006.01) |
| *H04L 12/413* | (2006.01) |

(52) U.S. Cl.
CPC ............ *H04L 12/403* (2013.01); *H04B 3/542* (2013.01); *H04L 5/14* (2013.01); *H04L 12/413* (2013.01)

(58) Field of Classification Search
CPC ....... H04L 12/403; H04L 5/14; H04L 12/413; H04B 3/542
See application file for complete search history.

(56) References Cited

U.S. PATENT DOCUMENTS

| | | | |
|---|---|---|---|
| 4,210,780 A | * | 7/1980 | Hopkins ............... G06F 13/376 370/445 |
| 4,719,458 A | | 1/1988 | Miesterfeld et al. |
| 5,311,114 A | * | 5/1994 | Sambamurthy ... H04L 12/40136 370/296 |
| 5,446,735 A | | 8/1995 | Tobagi et al. |

(Continued)

FOREIGN PATENT DOCUMENTS

| | | |
|---|---|---|
| KR | 100165440 | 2/1999 |
| KR | 2004104326 B1 | 12/2004 |
| KR | 2012066566 B1 | 6/2012 |

OTHER PUBLICATIONS

Extended European Search Report in European Application No. 17184633.0, dated Nov. 3, 2017, 9 pages (with English Translation).

(Continued)

*Primary Examiner* — Jean B Corrielus
(74) *Attorney, Agent, or Firm* — Fish & Richardson P.C.

(57) ABSTRACT

A communication method for electronic devices includes: determining whether a transmission line is occupied or unoccupied; based on a determination that the transmission line is unoccupied: transmitting transmission data via the transmission line; receiving return data that returns via the transmission line after the transmission data has been transmitted; and determining whether data collision exists on the transmission line by comparing the transmission data with the return data, and based on a determination that the transmission line is occupied: waiting for a predetermined first time interval to elapse; and after the predetermined first time interval has elapsed, returning to the determining whether the transmission line is occupied or unoccupied.

9 Claims, 7 Drawing Sheets

(56) References Cited

U.S. PATENT DOCUMENTS

| | | | |
|---|---|---|---|
| 2004/0160976 A1 | 8/2004 | Ha et al. | |
| 2008/0002735 A1* | 1/2008 | Poirier | H04L 12/403 |
| | | | 370/445 |
| 2010/0067451 A1* | 3/2010 | Hall | H04W 74/0875 |
| | | | 370/329 |
| 2015/0288534 A1* | 10/2015 | Du | H04B 3/544 |
| | | | 370/445 |
| 2016/0269303 A1* | 9/2016 | Park | H04W 74/085 |
| 2016/0309367 A1* | 10/2016 | Li | H04L 12/6418 |
| 2017/0367110 A1* | 12/2017 | Li | H04W 72/1268 |

OTHER PUBLICATIONS

Marais, "RS-485/RS-422 Circuit Implementation Guide: AN-960 Application Note," Analog Devices, Inc., 2008, 12 pages.

* cited by examiner

-Prior Art-

ELECTRONIC DEVICE AND COMMUNICATIONS METHOD THEREOF

CROSS-REFERENCE TO RELATED APPLICATIONS

This application claims an earlier filing date and right of priority to Korean Patent Application No. 10-2016-0104042 filed on Aug. 17, 2016, in the Korean Intellectual Property Office, the content of which is incorporated herein by reference in its entirety.

TECHNICAL FIELD

The present disclosure relates to an electronic device that conducts communications via an RS-485 interface, and a communications method of an electronic device.

BACKGROUND

As digital technology evolves, household appliances such as digital refrigerators, digital air conditioners and digital washing machines, and a variety of electronic devices including digital television receivers, digital video/audio devices and the like are emerging. Various home network technologies have been proposed to facilitate control of such electronic devices. E.g., a user may connect the electronic devices with an interface cable and control the operation of other devices by using a television receiver or a computer system having a display screen as a control device. Examples of home networking technologies for connecting electronic devices include Living network Control Protocol (LnCP) based on PLC (Power Line Communication), Universal Plug and Play (UPnP) based on HTML (Hyper Text Markup Language), HNCP (Home Network Control Protocol), HAVi (Home Audio/Video interoperability), and RS-485 interface.

The RS-485 interface is an electrical interface defined by the EIA/TIA-485 interface. The physical connector and pin arrangement are not specified. It is defined as the lowest layer of field buses such as BITBUS, PROFIBUS and INTERBUS specified in IEEE 1118. The RS-485 interface is well-suited for distributed control and automation, is robust to noise, and supports a multi-drop communications environments. In addition, the RS-485 interface can communicate at the rate up to 12 Mbps, providing sufficient communications speed for home networking applications at home. In addition, the bus structure does not affect another device when it is added or removed.

In an RS-485 interface communications system, one of several electronic devices connected to an RS-485 interface may be designated as a master device, such that it controls overall data transmission/reception. The master device refers to a device controlling the overall transmission/reception in a network in which a number of devices are connected by the RS-485 interface, and the slave devices refer to all other devices except the master device.

In the RS-485 interface communications system, the master device and the slave devices communicate with each other by polling based on the identification numbers (IDs) of the counterpart devices.

FIG. 1 illustrates an example of a preexisting network 100 of electronic devices connected through an RS-485 interface. Referring to FIG. 1, a communication is started when master device 101 sends a request packet for polling to slave devices 102 through 105 via a transmission line. The request packet sent by the master device 101 includes the identification number of the slave device to receive the request packet. Each of the slave devices 102 through 105 connected to the RS-485 interface checks if the request packet sent by the master device 101 is addressed to it.

For example, when the slave device 104 determines that the request packet has been addressed to it, the slave device 104 immediately sends a response packet to the master device 101, completing the polling process for a single slave device. At this point, only the slave device 104 can transmit data to the master device 101.

In such a polling scheme, even when a slave device wants to send data to the master device, the salve device cannot transmit data without permission of the master device. In addition, the request packet and the response packet have to be sent and received before every data transmission. As a result, in electronic devices employing such a polling scheme, communications may be slow and prone to delay. Such low communications speed and communications delay may become more serious as the number of electronic devices connected to the transmission line increases.

SUMMARY

Techniques, methods of communication, and an electronic device implementing the methods of communication are described herein.

In one aspect, a communication method for electronic devices includes: determining whether a transmission line is occupied or unoccupied; based on a determination that the transmission line is unoccupied: transmitting transmission data via the transmission line; receiving return data that returns via the transmission line after the transmission data has been transmitted; and determining whether data collision exists on to the transmission line by comparing the transmission data with the return data, and based on a determination that the transmission line is occupied: waiting for a predetermined first time interval to elapse; and after the predetermined first time interval has elapsed, returning to the determining whether the transmission line is occupied or unoccupied.

Implementations may include one or more of the following features. For example, the transmitting of the transmission data includes simultaneously generating a transmission enable signal and a reception enable signal as to enable full-duplex communications.

In some implementations, the determining whether data collision exists on the transmission line includes: determining whether the transmission data and the return data is identical or different; based on the determination that the transmission data and the return data is identical, determining that no data collision exists on the transmission line; and based on the determination that the transmission data and the return data is different, determining that data collision exists on the transmission line.

In some implementations, the communication method includes: based on the determination that data collision exists on the transmission line, waiting for a predetermined second time interval to elapse; and after the predetermined second time interval has elapsed, returning to determining whether the transmission line is occupied or unoccupied.

In some implementations, the communication method includes: based on the determination that data collision exists on the transmission line, increasing the second time interval.

In another aspect, an electronic device includes: a communication unit configured to conduct data communication via a transmission line by transmitting or receiving data to and from another electronic device; and a control unit configured to control the communication unit by: determining whether the transmission line is occupied or unoccupied; based on the determination that the transmission line is unoccupied: transmitting, by the communication unit, transmission data via the transmission line; receiving, by the communication unit, return data that returns via the transmission line after the transmission data has been transmitted; and determining whether data collision exists on the transmission line by comparing the transmission data with the return data.

Implementations may include one or more of the following features. For example, the communication unit includes: a transmission enable port and a reception enable port connected to the control unit; and a first transmission/receiving port and a second transmission/receiving port connected to the transmission line.

In some implementations, the control unit is configured to control the communication unit by: providing a transmission enable signal to the transmission enable port and providing a reception enable signal to the reception enable port of the communication unit at the same time.

In some implementations, the electronic device includes an inverting element; the communication unit includes: a transmission/reception enable port connected to the control unit; and a first transmission/receiving port and a second transmission/receiving port connected to the transmission line, wherein the inverting element is connected to a transmission enable line or a reception enable line.

In some implementations, the communication unit includes: a transmission enable port and a reception enable port connected to the control unit; and a first receiving port, a second receiving port, a first transmitting port, and a second transmitting port connected to the transmission line, wherein the first receiving port and the first transmitting port are connected to each other, and the second receiving port and the second transmitting port are connected to each other.

In some implementations, the control unit checks again whether the transmission line is occupied after a predetermined first time interval has elapsed based on a determination that the transmission line is occupied.

In some implementations, the control unit determines that no data collision exists on the transmission line based on the transmission data being identical to the return data, and determines that data collision exists on the transmission line otherwise.

In some implementations, the control unit is configured to control the communication unit by: based on a determination that data collision exists on the transmission line, waiting for a predetermined second time interval to elapse; and after the predetermined second time interval has elapsed, returning to determining whether the transmission line is occupied or unoccupied.

In some implementations, the control unit is configured to control the communication unit by: based on the determination that data collision exists on the transmission line, increasing the second time interval.

All or part of the features described throughout this application may be implemented as a computer program product including instructions that are stored on one or more non-transitory machine-readable storage media, and that are executable on one or more processing devices. All or part of the features described throughout this application may be implemented as an apparatus, method, or electronic system that may include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent. Effects of the technology should not be limited to the aforementioned effects and other unmentioned effects will be clearly understood by those skilled in the art from the claims.

BRIEF DESCRIPTION OF THE DRAWINGS

Like reference symbols in the various drawings indicate like elements.

DETAILED DESCRIPTION

Figure 1:
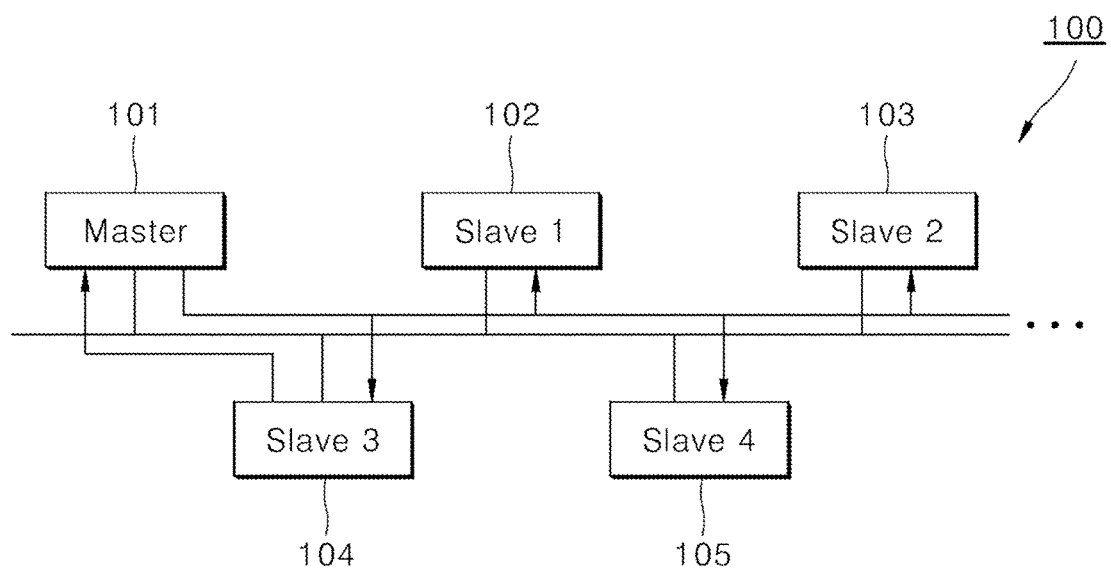
FIG. 1 is a block diagram illustrating an example of a preexisting network of electronic devices connected through an RS-485 interface.

An RS-485 interface employing a half-duplex communications scheme cannot simultaneously transmit and receive data through the transmission line. In order to solve this shortcoming, RS-485 interfaces capable of conducting full-duplex communications have been developed. Unfortunately, even the RS-485 interface capable of conducting full-duplex communications can suffer from communication delays due to data collision occurring on the transmission line.

To employ a full-duplex communications scheme, the preexisting transmission line and electronic devices using the half-duplex RS-485 interface may have to be replaced, which may take a long time and be expensive to implement.

Techniques, methods of communication, and an electronic device implementing the methods of communication are described herein.

In accordance with an implementation of the present disclosure, a communications method for electronic devices includes: checking if a transmission line is occupied; transmitting transmission data via the transmission line if it is determined that the transmission line is unoccupied; receiving return data returning via the transmission line after the transmission data has been transmitted; and determining whether there is data collision on the transmission line by comparing the transmission data with the return data.

In accordance with an implementation of the present disclosure, an electronic device includes: a communication unit configured to conduct data communications via a transmission line; and a control unit configured to control the communication unit so that it transmits data to another electronic device or receives data from another electronic device. The control unit checks if the transmission line is occupied, controls the communication unit so that it transmits transmission data via the transmission line if it is determined that the transmission line is unoccupied and receives return data returning via the transmission line after the transmission data has been transmitted, and determines whether there is data collision on the transmission line by comparing the transmission data with the return data.

In some implementations, preexisting electronic devices can be adapted to implement the disclosed methods with relatively short development time and low cost.

In some implementations, communications speed and delay can be improved by allowing data to be transmitted without permission of another device in conducting communications between electronic devices employing an RS-485 interface. E.g., electronic devices are not designated as a master device and slave devices. Accordingly, all of the electronic devices behave like a master device. In other words, each of the electronic devices may transmit data to another electronic device whenever it wants without permission of another device.

In some implementations, preexisting transmission lines and electronic devices employing an RS-485 interface can be used for implementing a full-duplex communications scheme to save time and cost.

In some implementations, potential data collision on a full-duplex RS-485 interface can be sensed. For example, an electronic device according to the present disclosure generates a transmission enable signal and a reception enable signal simultaneously when it transmits data via a transmission line. By simultaneously generating the two enable signals, the electronic device is able to simultaneously transmit and receive data.

A data collision occurs when two or more electronic devices transmit data via a single transmission line at the same time. According to an exemplary implementation of the present disclosure, an electronic device transmits data and receives back the data it has transmitted via the transmission line at the same time. By comparing the transmitted data with the received data, it may be possible to determine whether there is a data collision on the transmission line.

Figure 2:
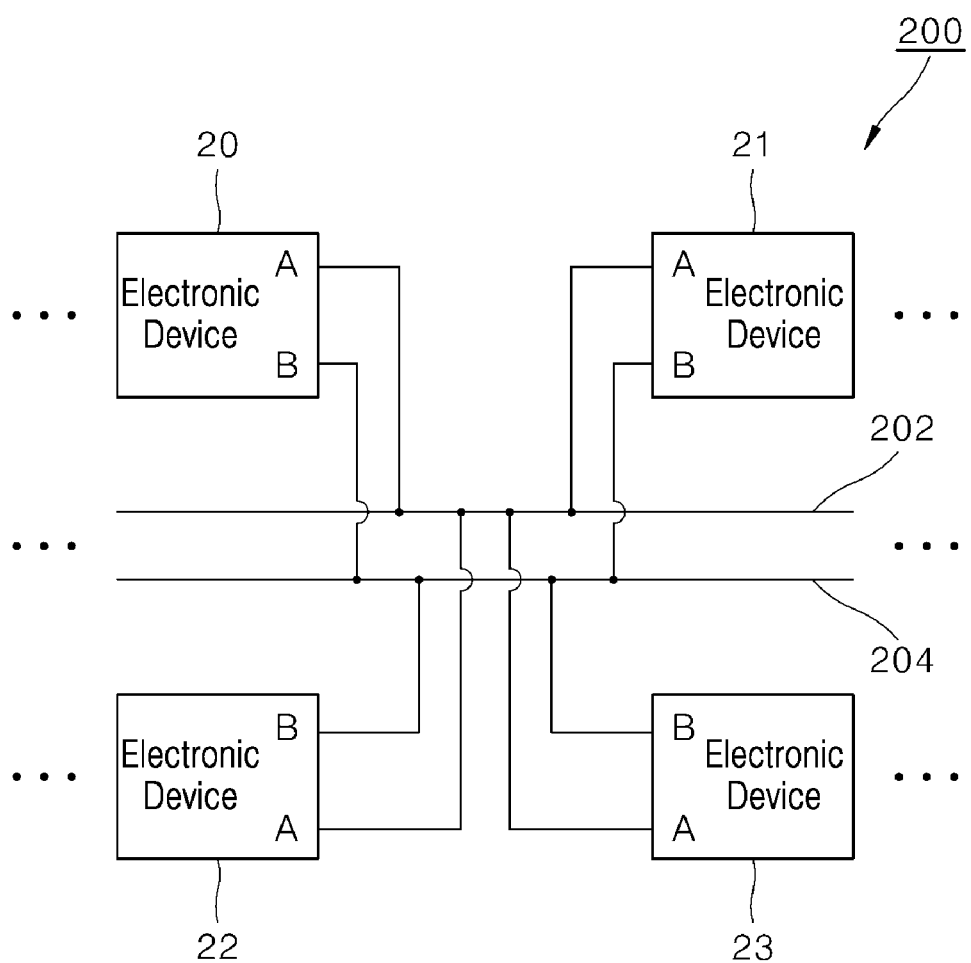
FIG. 2 is a block diagram illustrating an example of a network of electronic devices connected through an RS-485 interface.

FIG. 2 illustrates an example of a network 200 of electronic devices connected through an RS-485 interface. Referring to FIG. 2, the electronic devices 20 to 23 employing the RS-485 interface according to an exemplary implementation of the present disclosure are connected to the transmission lines 202 and 204, to conduct communications amongst each other. Although FIG. 2 shows only four electronic devices 20 through 23 for convenience of illustration, the number of electronic devices connected to the transmission lines 202 and 204 may vary in other implementations.

Each electronic device has a first transmission/receiving port A and a second transmission/receiving port B. The first transmission/receiving port A is connected to a first transmission line 202, and the second transmission/receiving port B is connected to a second transmission line 204. The electronic devices convert the data to be transmitted into an electric potential difference (i.e., Voltage) the first transmission/receiving port A and the second transmission/receiving port B, and transmits it to another electronic device. In addition, each of the electronic devices receives the data transmitted by another electronic device by converting the potential difference of a signal received through the first transmission/receiving port A and the second transmission/receiving port B into data.

As described above with respect to FIG. 1, in the preexisting system, one of a plurality of electronic devices connected to an RS-485 network is designated as a master device, the rest of the devices designated as slave devices, and the slave devices may transmit data only when the master device permits. In contrast, as shown in FIG. 2, the electronic devices 20 through 23 are peer devices that may transmit data on the transmission lines 202 and 204 at a desired time without permission of other electronic devices.

The implementation shown in FIG. 2 may be applied to previously described home appliances or home network systems. For example, when the electronic devices according to the exemplary implementation of the present disclosure are applied to an air conditioner system having a plurality of outdoor units or indoor units, each of the electronic devices 20 through 23 may correspond to one of the outdoor units or the indoor units. As another example, when the electronic devices according to the exemplary implementation of the present disclosure are applied to a home network system, the electronic devices 20 through 23 may correspond to home appliances capable of conducting RS-485 communications such as a refrigerator, a computer, a TV and an audio system, respectively. In general, the exemplary implementations of the present disclosure may be applied to all electronic devices employing the RS-485 interface, and a network system consisting of such electronic devices.

In the network 200, each of the electronic devices 20 through 23 employs a 2-wire 1-channel communications scheme. That is, each of the electronic devices 20 through 23 may transmit or receive data through two transmission/receiving ports A and B and two transmission lines 202 and 204 connected to the respective transmission/receiving ports. The communications scheme in which two transmission lines form one channel is defined as a 2-wire 1-channel communications scheme. It is to be understood that the exemplary implementations of the present disclosure may be equally applied to electronic devices employing a 4-wire 2-channel communications scheme. The communications method according to exemplary implementations of the present disclosure using electronic devices employing a 4-wire 2-channel communications scheme will be described later with reference to FIG. 7.

Figure 3:
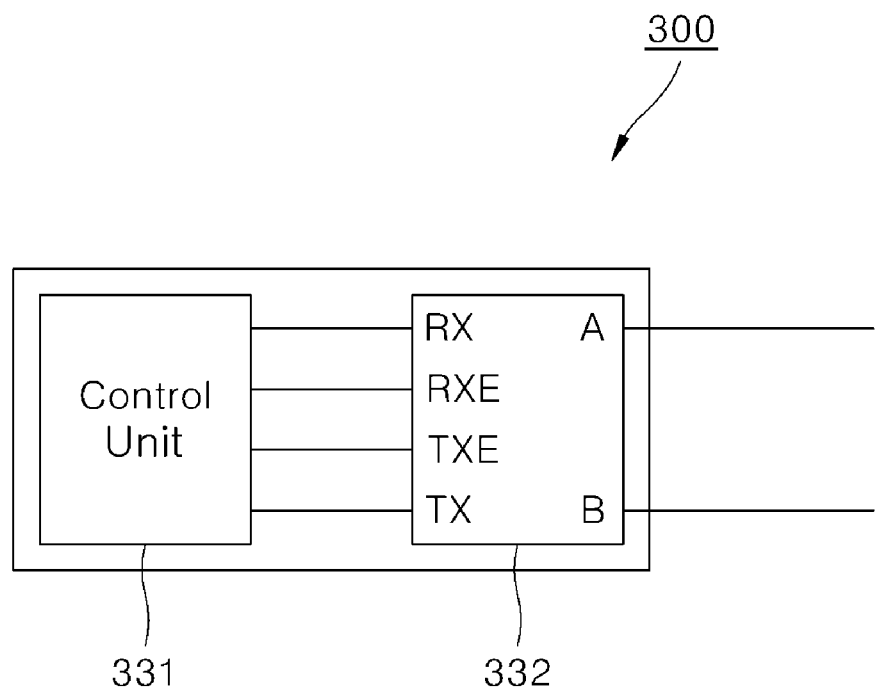
FIG. 3 is a block diagram illustrating an internal configuration of an example of an electronic device.

FIG. 3 illustrates an internal configuration of an example of an electronic device. Referring to FIG. 3, the electronic device 300 may include a control unit 331 and a communication unit 332. The electronic device 300 may provide the electronics devices 20 through 23.

The control unit 331 controls the communication unit 332 so that it transmits data to another electronic device or receives data from another electronic device. The communication unit 332 transmits or receives data via transmission lines based on receiving of a transmission enable signal or a reception enable signal provided by the control unit 331.

For example, when data is to be transmitted to another electronic device, the control unit 331 delivers the data to the communication unit 332 through a data transmitting port TX, and applies a transmission enable signal (e.g., logical '1') to the communication unit 332 through a transmission enable port TXE. Upon receiving of the transmission enable signal, the communication unit 332 converts the data received from the control unit 331 through the data transmitting port TX into a series of two or more predetermined voltage value (e.g., 0 V and 5V), to output different electric signals according to the different converted voltage values to the transmission lines through the first transmission/receiving port A and the second transmission/receiving port B. If the control unit 31 applies a transmission disable signal (e.g., logical '0') via the transmission enable port TXE, the communication unit 332 becomes inoperable to transmit data.

Further, when data is received from another electronic device, the control unit 331 applies a reception enable signal (e.g., logical '0') to the communication unit 332 via a reception enable port RXE. The communication unit 332 become operable to receive data by the application of the reception enable signal and receives electrical signals through the first transmission/receiving port A and the second transmission/receiving port B. Then, the communication unit 332 converts the received electrical signal into data and delivers the converted data to the control unit 331 through a data receiving port RX. If the control unit 331 applies a reception disable signal (e.g., logical '1') via the reception enable port RXE, the communication unit 32 becomes inoperable to receive data.

In some implementations, the control unit 331 can apply one of the transmission enable signal or the reception enable signal, but not both, to the communication unit 332 of the electronic device 300. By selectively applying the enable signals in this manner, the communication unit 332 can perform half-duplex communications.

In some implementations, the control unit 331 can apply both the transmission enable signal and the reception enable signal to the communication unit 332 at the same time. When the transmission enable signal and the reception enable signal are applied at the same time, the communication unit 332 becomes operable to transmit and receive data simultaneously, i.e., perform full-duplex communications. Thus, the electronic device 300 can be configured to conduct both half-duplex communications and full-duplex communications.

Hereinafter, a communications method for electronic devices according to the present disclosure will be described in detail with reference to FIGS. 2 to 4.

Figure 4:
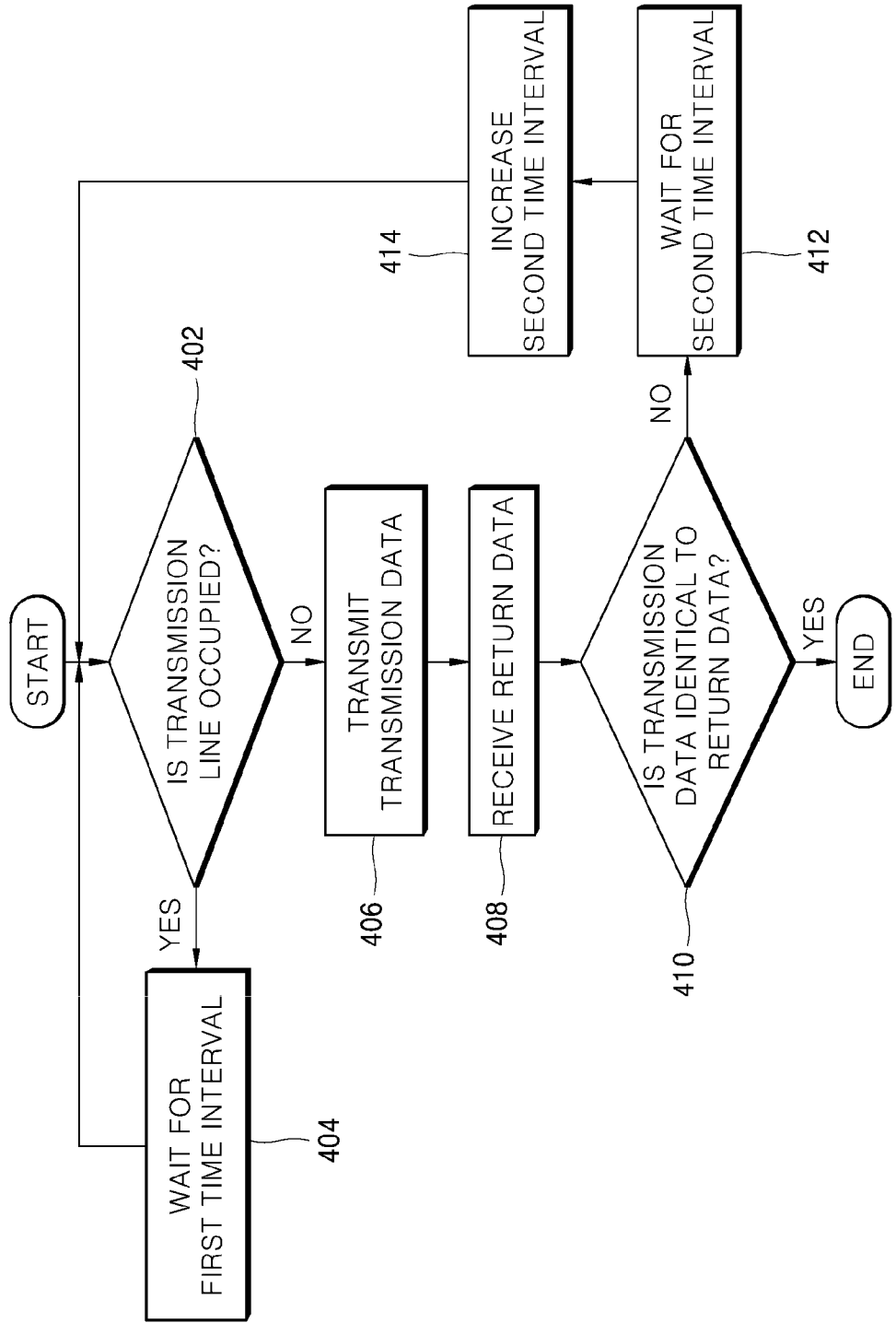
FIG. 4 is a flowchart illustrating an example of a communications method for electronic devices.

FIG. 4 illustrates an example of a communications method for electronic devices. Referring to FIG. 4, initially, the control unit 331 checks whether the transmission lines 202 and 204 are occupied (step 402). In other words, the control unit 331 checks if data is currently being transmitted by another electronic device through the transmission lines 202 and 204.

Based on the determination in step 402 that there is data transmitted by another electronic device on the transmission lines 202 and 204, that is, when the transmission lines 202 and 204 are occupied, the control unit 331 does not transmit data and waits for a predetermined first time interval (step 404). The first time interval is a period of time that can be set by a user. Preferably, the first time interval is set to be equal to or greater than the time taken until data transmitted through the transmission lines 202 and 204 is completely received by another electronic device. When the first time interval has elapsed, the control unit 331 checks again to determine whether the transmission lines 202 and 204 are occupied (step 402).

Based on the determination in step 402 that the transmission lines 202 and 204 are empty, the control unit 331 controls the communication unit 332 so that it transmits data to be transmitted to another electronic device, that is, transmission data through the transmission lines 202 and 204. To this end, the control unit 331 delivers the transmission data to the data transmitting port TX of the communication unit 332. In addition, the control unit 331 applies a transmission enable signal through the transmission enable port TXE of the communication unit 332 and also applies a reception enable signal through a reception enable port RXE of the communication unit 332.

In other words, the control unit 331 according to the exemplary implementation of the present disclosure controls the communication unit 332 so that it can conduct both data transmission and data reception by simultaneously applying the transmission enable signal and the reception enable signal to the communication unit 332 when the transmission lines 202 and 204 are unoccupied. Such simultaneous application of transmission and reception enable signals may enable the electronic device 300 to conduct full-duplex communications.

The control unit 331 may store the transmission data delivered to the data transmitting port TX of the communication unit 332 in a buffer. The stored transmission data is to be compared with return data to be described later.

Upon the application of the transmission enable signal, the communication unit 332 transmits the transmission data to the transmission lines 202 and 204 through the first transmission/receiving port A and the second transmission/receiving port B (step 406). The transmission data transmitted by the communication unit 332 is transmitted to another electronic device through the transmission lines 202 and 204, and is transmitted back to the first transmission/receiving port A and the second transmission/receiving port B through the transmission lines 202 and 204 (step 408). This is because the control unit 31 simultaneously applied the transmission enable signal and the reception enable signal to the reception enable port RXE of the communication unit 32.

The return data is defined as data that has been transmitted by the communication unit 332 and then returned through the first transmission/receiving port A and the second transmission/receiving port B. If the transmission data transmitted by the communication unit 332 collides with data sent by another electronic device on the transmission lines 202 and 204, the return data is different from the transmission data. On the other hand, if the transmission data transmitted by the communication unit 332 does not collide with the data transmitted by another device on the transmission lines 202 and 204, the return data is identical to the transmission data.

Referring again to FIG. 4, the control unit 331 determines whether or not the previously stored transmission data is identical to the return data (step 410). If it is determined in step 410 that the transmission data is identical to the return data, the control unit 31 determines that no data collision occurred on the transmission lines 202 and 204. Absence of data collision on the transmission lines 202 and 204 can signify that the transmission data has been transmitted to another electronic device without getting corrupted, and accordingly the control unit 331 completes the transmission of the data.

On the contrary, based on the determination in step 410 that the transmission data is different from the return data, the control unit 331 determines that data collision has occurred on the transmission lines 202 and 204. In such cases, the control unit 331 determines that the transmission data has been corrupted or the transmission data has not been transmitted yet.

Based on the determination in step 410 that the transmission data is different from the return data, the control unit 331 does not transmit the transmission data and waits for a second time interval (step 412). The second time interval is a period of time that can be set by a user in advance. Preferably, the second time interval is set to be equal to or greater than the time taken until data transmitted through the transmission lines 202 and 204 is completely received by another electronic device.

In some implementations, the second time interval is set to be greater than the first time interval. For example, the second time interval may be set based on the relationship T2=k×T1, where T1 denotes the first time interval, and T2 denotes the second time interval. In addition, k denotes a proportionality constant set by a user, where k may be equal to or greater than 1.

When the second time interval elapses, the control unit 331 increases the second time interval (step 414). For example, the control unit may increase the value of k by one whenever step 414 is performed. As another example, the control unit 31 may increase the value of k by two. In this manner, the control unit 31 gradually increases the second time interval 414 whenever step 414 is performed.

According to an exemplary implementation of the present disclosure, the second time interval increases in correspondence to the number of times that the transmission data to be transmitted by the control unit 331 collides with another data on the transmission lines 202 and 204. By doing so, the probability of data collision occurring on the transmission lines 202 and 204 gradually decreases, such that stable data transmission/reception can be carried out.

Referring again to FIG. 4, the control unit 331 increases the second time interval 414 and then repeats steps 402 to 414 until the transmission of the transmission data is completed, that is, until it is determined that no data collision occurs on the transmission lines 202 and 204.

On the other hand, based on the determination in step 410 that no data collision occurs, such that the transmission data has been successfully transmitted, the control unit 331 may reset the second time interval back to the initial value. Alternatively, the control unit 331 may maintain the second time interval, which was increased during the previous transmission, at the initial value for the next transmission.

In some implementations, when the control unit 331 transmits the transmission data, the transmission enable signal and the reception enable signal are simultaneously applied to the communication unit 332, such that the communication unit 332 can conduct full-duplex communications. Such full-duplex communications may be used to check whether the transmission data has been correctly transmitted to another electronic device without corruption.

In some implementations, the second time interval is gradually increased in correspondence to the number of times that transmission data is corrupted or not transmitted, thereby reducing the number of times of data transmission attempts and enabling more stable data transmission.

Hereinafter, implementations of various structures of the communication unit for practicing the communications method as described above will be described with reference to FIGS. 5 to 7.

Figure 5:
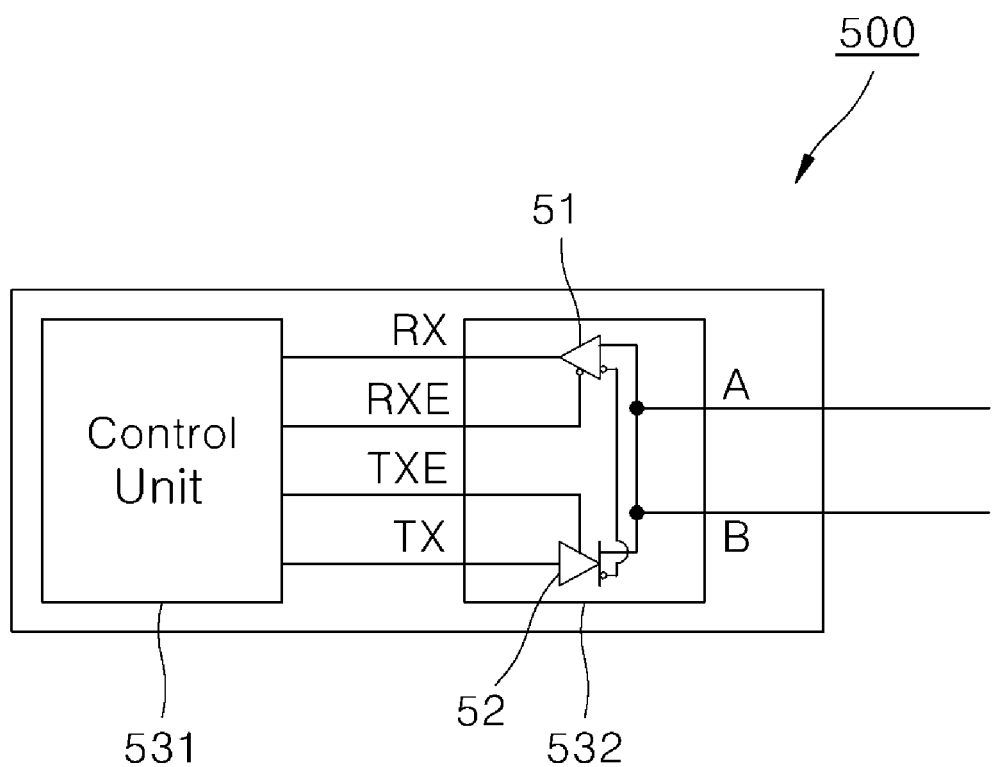
FIG. 5 is a block diagram illustrating an internal configuration of an example of an electronic device employing a 2-wire RS-485 interface.

FIG. 5 illustrates an internal configuration of an example of an electronic device 500 employing a 2-wire RS-485 interface. Referring to FIG. 5, a communication unit 532 included in the electronic device 500 employs a 2-wire 1-channel communications scheme. The communication unit 532 transmits and receives data through the first transmission/receiving port A, the second transmission/receiving port B, and two transmission lines connected to the respective transmission/receiving ports. The electronic device 500 may provide the electronic devices 20 through 23, and the communication unit 532 and controller 531 are similar to the communication unit 332 and the controller 331, except as described.

The communication unit 532 includes a data transmitting port TX for receiving data to be transmitted from the control unit 531, and a data receiving port RX for delivering data received through the ports A and B to the control unit 531.

The communication unit 532 becomes operable to transmit data by receiving a transmission enable signal (e.g., logical 1) from the control unit 531 through the transmission enable port TXE. When the transmission enable signal is applied to a comparator 52, the comparator 52 converts the data input through the data transmitting port TX into electric signals having different voltage values. The electric signal converted by the comparator 52 is transmitted to another electronic device via the first transmission/receiving port A and the second transmission/receiving port B. On the contrary, if the transmission disable signal (e.g., logical 0) is applied via the transmission enable port TXE, the comparator 52 is disabled and thus the communication unit 32 becomes inoperable to transmit data.

The communication unit 532 is operable to receive data upon receiving the reception enable signal (e.g., logical 0) from the control unit 531 via the reception enable port RXE. When the reception enable signal is input to the comparator 51, an electric signal sent from another electronic device or from the electronic device 500 itself is supplied to the comparator 51 through the first transmission/receiving port A and the second transmission/receiving port B. The comparator 51 converts the difference between the voltage values of the electric signals input to the first transmission/receiving port A and the second transmission/receiving port B into data, and the converted data is delivered to the control unit 31 through the data receiving port RX. On the contrary, if the reception disable signal (e.g., logical 1) is applied via the reception enable port RXE, the comparator 51 is disabled and thus the communication unit 532 becomes inoperable to receive data.

In some implementations, the electronic device 500 has substantially the same structure as the 2-wire RS-485 interface electronic device used in a conventional preexisting network system. However, since the control unit 531 applies only one of the transmission enable signal and the reception enable signal to the communication unit 532, the communication unit 532 is limited to conducting only half-duplex communications. By modifying the internal algorithm or program of the control unit 531 so as to simultaneously apply the transmission enable signal and the reception enable signal as in step 406 described above with reference to FIG. 4, full-duplex communications may be enabled. In doing so, it is not necessary to modify the internal structure of the communication unit 532.

Therefore, when the network 200 as shown in FIG. 2 is established using the electronic device 500, only the internal algorithm or program of the control unit 531, which is similar to the control unit 331, needs to be changed, such that a full-duplex RS-485 communications network can be applied at reduced cost.

Figure 6:
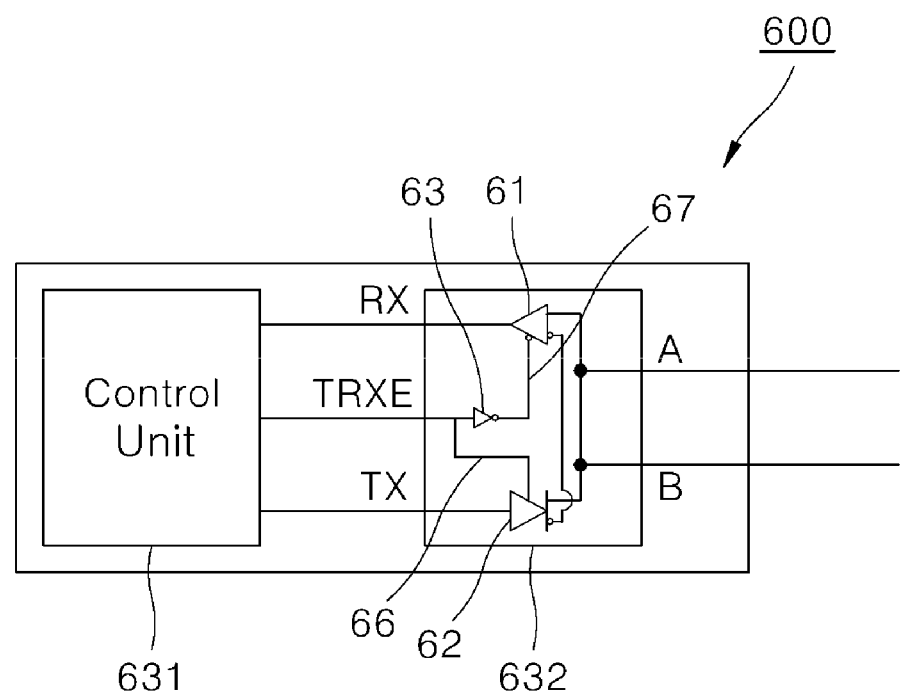
FIG. 6 is a block diagram illustrating an example of an electronic device employing a 2-wire RS-485 interface.

FIG. 6 illustrates an example of an electronic device 600 employing a 2-wire RS-485 interface. Referring to FIG. 6, a communication unit 632 employs a 2-wire 1-channel communications scheme, similar to the communication unit 532 shown in FIG. 5. The communication unit 632 transmits and receives data through the first transmission/receiving port A, the second transmission/receiving port B, and two transmission lines connected to the respective transmission/receiving ports. The electronic device 600 may provide the electronic devices 20 through 23, and the communication unit 632 and controller 631 are similar to the communication unit 332 and the controller 331, except as described.

The communication unit 632 includes a data transmitting port TX for receiving data to be transmitted from the control unit 631, and a data receiving port RX for delivering data received through the ports A and B to the control unit 631.

In addition, the communication unit 632 has a transmission/reception enable port TRXE. An inverting element, e.g., a NOT gate 63, may be connected between the transmission/reception enable port TRXE and the comparator 61 of the communication unit 632 via a transmission enable line 66 or a reception enable line 67. By providing the NOT gate 63, the communication unit 632 can operate in a full-duplex communications scheme.

More specifically, the communication unit 632 receives the transmission/reception enable signal (e.g., logical 1) from the control unit 631 via the transmission/reception enable port TRXE, such that it becomes operable to transmit and receive data. When data is input via the data transmitting port TX, the comparator 62 converts the input data into electric signals having different voltage values. The electric signal converted by the comparator 62 is transmitted to another electronic device via the first transmission/receiving port A and the second transmission/receiving port B.

The communication unit 632 may receive an electric signal sent from another device or from the electronic device 20 itself via the first transmission/receiving port A and the second transmission/receiving port B when the transmission/reception enable signal (e.g., logical 1) from the control unit 631 via the transmission/reception enable port TRXE is received. The electric signals received through the first transmission/receiving port A and the second transmission/receiving port B are supplied to the comparator 61. The comparator 61 converts the difference between the voltage values of the electric signals input to the first transmission/receiving port A and the second transmission/receiving port B into data, and the converted data is delivered to the control unit 631 through the data receiving port RX.

If the transmission/reception disable signal (e.g., logical 0) is applied via the transmission/reception enable port TXE, the comparators 61 and 62 are disabled and thus the communication unit 632 becomes inoperable to transmit/receive data.

In the prior art, a preexisting communication unit of an electronic device having the transmission/reception enable port TRXE does not include the inverting element (e.g., NOT gate 63). Accordingly, when a logical 1 is received at the transmission/reception enable port TRXE, the preexisting communication unit is operable only for transmission of data, and when a logical 0 is received, the preexisting communication unit is operable only for receiving of data. In other words, the preexisting electronic device not having the inverting element shown in FIG. 6, can only support a half-duplex communications scheme.

In contrast, by adding the inverting element 63 between the transmission/reception enable port TRXE and the comparator (e.g., 61), it is possible to achieve the same effect as simultaneously applying the transmission enable signal and the reception enable signal to the communication unit 632 as in step 406 shown in FIG. 4.

Therefore, when the network 200 as shown in FIG. 2 is established using the electronic device 600, only the inverting element 63 is added to the control unit 632 with respect to other control units (e.g., control unit 532), such that some implementations of the present disclosure can be applied at very low cost.

Figure 7:
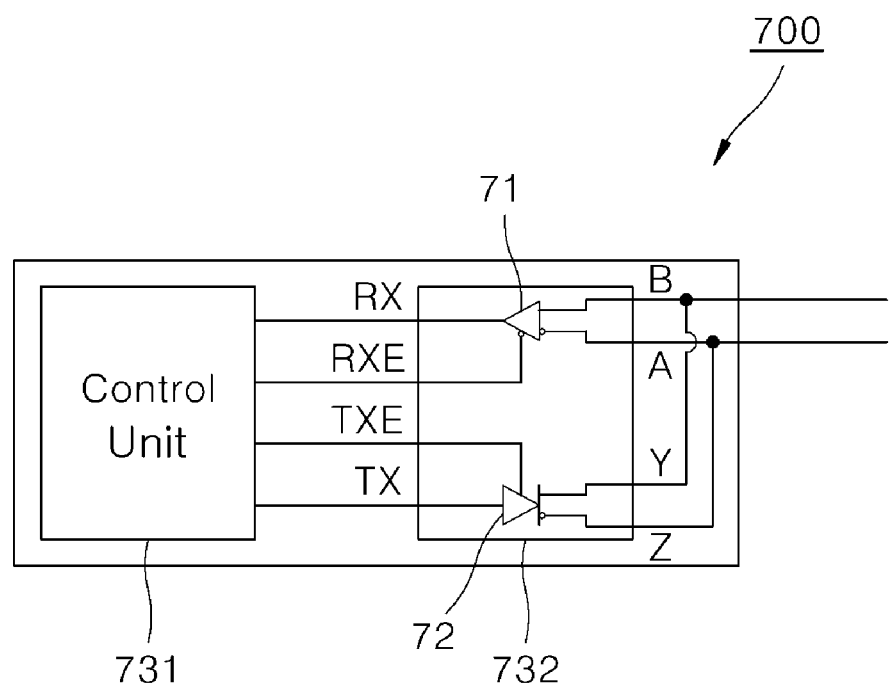
FIG. 7 is a block diagram illustrating an internal configuration of an example of an electronic device employing a 4-wire RS-485 interface.

FIG. 7 illustrates an internal configuration of an example of an electronic device 700 employing a 4-wire RS-485 interface. Referring to FIG. 7, a communication unit 732 included in the electronic device 700 is different from that shown in FIGS. 5 and 6 in that it employs a 4-wire 2-channel communications scheme. The electronic device 700 may provide the electronic devices 20 through 23, and the communication unit 732 and controller 731 are similar to the communication unit 332 and the controller 331, except as described.

The communication unit 732 receives data transmitted from another electronic device via a first receiving port B and a second receiving port A, and transmits data to another electronic device via a first transmitting port Y and a second transmitting port Z. As such, the communication unit 732 has separate reception channels A and B and transmission channels Y and Z, and thus it may be referred to as a 4-wire 2-channel communications scheme.

The communication unit 732 includes a data transmitting port TX for receiving data to be transmitted from the control unit 731, and a data receiving port RX for delivering data received through the reception channels A and B to the control unit 731.

The communication unit 732 becomes operable to transmit data by receiving a transmission enable signal (e.g., logical 1) from the control unit 731 through the transmission enable port TXE. When the transmission enable signal is applied to a comparator 72, the comparator 72 converts the data input through the data transmitting port TX into electric signals having different voltage values. The electric signal converted by the comparator 72 is transmitted to another electronic device via the first transmitting port Y and the second transmitting port Z. On the contrary, if the transmission disable signal (e.g., logical 0) is applied via the transmission enable port TXE, the comparator 72 is disabled and thus the communication unit 32 becomes inoperable to transmit data.

The communication unit 732 shown in FIG. 7 is operable to receive data upon receiving the reception enable signal (e.g., logical 0) from the control unit 731 via the reception enable port RXE. When the reception enable signal is input to the comparator 71, an electric signal sent from another electronic device or from the electronic device 700 itself is input to the comparator 71 through the first receiving port B and the second receiving port A. The comparator 71 converts the difference between the voltage values of the electric signals input to the first receiving port B and the second receiving port A into data, and the converted data is delivered to the control unit 731 through the data receiving port RX. On the contrary, if the reception disable signal (e.g., logical 1) is applied via the reception enable port RXE, the comparator 71 does not operate and thus the communication unit 732 becomes inoperable to receive data.

It is to be noted that the electronic device 700 shown in FIG. 7 has substantially the same structure as the 4-wire RS-485 interface electronic device used in a preexisting network system. According to the prior art, however, since a control unit applies only one of the transmission enable signal and the reception enable signal to the communication unit, the communication unit conducts half-duplex communications only. Therefore, it is necessary to modify the internal algorithm or program of the control unit to simultaneously apply the transmission enable signal and the reception enable signal as in step 406 described above with reference to FIG. 4.

Also, in the prior art, since the reception channels A and B and the transmission channels Y and Z are connected to separate transmission lines, an electronic device may require four transmission lines for establishing a network. In contrast, according to an exemplary implementation of the present disclosure, as shown in FIG. 7, the first receiving port B and the first transmitting port Y are connected to each other, and the second receiving port A and the second transmitting port Z are connected to each other. By connecting the receiving ports and the transmitting ports to each other in this way, the electronic device 700 operates in a substantially 2-wire 1-channel communications scheme.

Thus, by simultaneously applying the transmission enable signal and the reception enable signal as in step 406 described above with reference to FIG. 4 using the electronic device 700, transmission data is transmitted via the transmit channels Y and Z and then return data returning via the transmission line may be transmitted through the reception channels A and B.

Accordingly, the preexisting electronic device employing 4-wire 2-channel communications scheme having the structure shown in FIG. 7 can be easily applied to the 2-wire 1-channel network 200 as shown in FIG. 2. That is, by modifying the internal algorithm or program of the control unit 731 so that the transmission enable signal and the reception enable signal are simultaneously applied to the communication unit 732 at the time of data transmission, and by connecting the first receiving port B to the first transmitting port Y and the second receiving port A to the second transmitting port Z, the exemplary implementations of the present disclosure can be implemented with a relatively simple configuration modification, incurring a very low cost.

The present disclosure as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although implementations have been described with reference to a number of illustrative implementations thereof, it should be understood that numerous other modifications and implementations can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:
1. An electronic device comprising:
 a communication unit configured to conduct data communication via a transmission line by transmitting or receiving data to and from another electronic device; and
 a control unit configured to control the communication unit by:
  determining whether the transmission line is occupied or unoccupied;
  based on the determination that the transmission line is unoccupied:
   transmitting, by the communication unit, transmission data via the transmission line;
   receiving, by the communication unit, return data that returns via the transmission line after the transmission data has been transmitted; and
   determining whether data collision exists on the transmission line by comparing the transmission data with the return data.
2. The device of claim 1, wherein the communication unit comprises:
 a transmission enable port and a reception enable port connected to the control unit; and
 a first transmission/receiving port and a second transmission/receiving port connected to the transmission line.
3. The device of claim 2, wherein the control unit is configured to control the communication unit by:
 providing a transmission enable signal to the transmission enable port and providing a reception enable signal to the reception enable port of the communication unit at the same time.
4. The device of claim 1, wherein:
 the electronic device comprises an inverting element;
 the communication unit comprises:
  a transmission/reception enable port connected to the control unit; and
  a first transmission/receiving port and a second transmission/receiving port connected to the transmission line; and
 the inverting element is connected to a transmission enable line or a reception enable line.
5. The device of claim 1, wherein the communication unit comprises:
 a transmission enable port and a reception enable port connected to the control unit; and
 a first receiving port, a second receiving port, a first transmitting port, and a second transmitting port connected to the transmission line,
 wherein the first receiving port and the first transmitting port are connected to each other, and the second receiving port and the second transmitting port are connected to each other.
6. The device of claim 1, wherein the control unit checks again whether the transmission line is occupied after a predetermined first time interval has elapsed based on a determination that the transmission line is occupied.
7. The device of claim 1, wherein the control unit determines that no data collision exists on the transmission line based on the transmission data being identical to the return data, and determines that data collision exists on the transmission line otherwise.
8. The device of claim 1, wherein the control unit is configured to control the communication unit by:
 based on a determination that data collision exists on the transmission line, waiting for a predetermined time interval to elapse; and after the predetermined time interval has elapsed, returning to determining whether the transmission line is occupied or unoccupied.

9. The device of claim 8, wherein the control unit is configured to control the communication unit by:
based on the determination that data collision exists on the transmission line, increasing the predetermined time interval.

* * * * *